United States Patent
Dasu et al.

(10) Patent No.: US 7,805,266 B1
(45) Date of Patent: Sep. 28, 2010

(54) METHOD FOR AUTOMATED DETECTION OF DATA GLITCHES IN LARGE DATA SETS

(75) Inventors: Tamraparni Dasu, New Providence, NJ (US); Theodore Johnson, New York, NY (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/906,104

(22) Filed: Jul. 17, 2001

(51) Int. Cl.
*G06F 19/00* (2006.01)
*G06F 17/30* (2006.01)

(52) U.S. Cl. .............................. 702/66; 702/179; 707/1; 707/3

(58) Field of Classification Search ................... 702/66, 702/179, 180, 181, 189, 190, 191; 707/1, 707/3, 6; 709/223, 229
See application file for complete search history.

(56) References Cited

U.S. PATENT DOCUMENTS

| | | | |
|---|---|---|---|
| 6,289,354 B1 * | 9/2001 | Aggarwal et al. | 707/104.1 |
| 6,446,068 B1 * | 9/2002 | Kortge | 707/6 |
| 6,449,612 B1 * | 9/2002 | Bradley et al. | 707/6 |
| 6,571,227 B1 * | 5/2003 | Agrafiotis et al. | 706/15 |
| 2002/0147703 A1 * | 10/2002 | Yu et al. | 707/2 |

OTHER PUBLICATIONS

Dasu et al., An Efficient Method for Representing, Analyzing and Visualizing Massive, High Dimensional Data, date of publicaton and publisher unknown.*
Johnson et al., "Comparing Massive High-dimensional Data Sets", In Proc. 4th Intl. Conf. on Knowledge Discovery and data Mining, p. 229-234, 1998.*
Internet Webpage at www.research.att.com/~drknow/pubs.html.*
Dasu et al, "Piecewise Linear Regression For Massive Data Through Dataspheres," 1998.
Dasu et al, "Efficient Modeling of Massive Longtitudinal Data Using Transition Arrays," 1998.

* cited by examiner

*Primary Examiner*—Patrick Assouad (57) ABSTRACT

Embodiments of the invention allow the efficient detection of glitches in a set of data. In one embodiment, a set of datapoints is received. The datapoints are transformed into a transformed space, and the transformed space is segmented into a plurality of regions. For each datapoint, a time series is generated representing the trajectory of the transformed datapoint through regions of the segmented transformed space. Data corresponding to transformed datapoints whose trajectories exhibit an unusual pattern are transmitted.

24 Claims, 6 Drawing Sheets

FIG. 1

$\underline{10}$

| | | BYTES RECEIVED | BYTES TRANSMITTED | FRAMES RECEIVED | FRAMES TRANSMITTED |
|---|---|---|---|---|---|
| CONNECTION 1 | DAY 1 | $x_{11}(t=1)$ | $x_{12}(t=1)$ | $x_{13}(t=1)$ | $x_{14}(t=1)$ |
| | DAY 2 | $x_{11}(t=2)$ | $x_{12}(t=2)$ | $x_{13}(t=2)$ | $x_{14}(t=2)$ |
| | ⋮ | ⋮ | ⋮ | ⋮ | ⋮ |
| | DAY 31 | $x_{11}(t=31)$ | $x_{12}(t=31)$ | $x_{13}(t=31)$ | $x_{14}(t=31)$ |
| CONNECTION 2 | DAY 1 | $x_{21}(t=1)$ | $x_{22}(t=1)$ | $x_{23}(t=1)$ | $x_{24}(t=1)$ |
| | DAY 2 | $x_{21}(t=2)$ | $x_{22}(t=2)$ | $x_{23}(t=2)$ | $x_{24}(t=2)$ |
| | ⋮ | ⋮ | ⋮ | ⋮ | ⋮ |
| | DAY 31 | $x_{21}(t=31)$ | $x_{22}(t=31)$ | $x_{23}(t=31)$ | $x_{24}(t=31)$ |
| ⋮ | ⋮ | ⋮ | ⋮ | ⋮ | ⋮ |
| CONNECTION m | DAY 1 | $x_{m1}(t=1)$ | $x_{m2}(t=1)$ | $x_{m3}(t=1)$ | $x_{m4}(t=1)$ |
| | DAY 2 | $x_{m1}(t=2)$ | $x_{m2}(t=2)$ | $x_{m3}(t=2)$ | $x_{m4}(t=2)$ |
| | ⋮ | ⋮ | ⋮ | ⋮ | ⋮ |
| | DAY 31 | $x_{m1}(t=31)$ | $x_{m2}(t=31)$ | $x_{m3}(t=31)$ | $x_{m4}(t=31)$ |

FIG. 2

$$y_{ij}(t) = \frac{x_{ij}(t) - \bar{x}_j}{s_j} \quad \sim 210$$

$$d_i(t) = \sqrt{\sum_{j=1}^{d} y_{ij}(t)} \quad \sim 220$$

FIG. 3

$\underline{y}_i \in P_{j+}$, if $|y_{ij}| > |y_{ik}|$ and $y_{ij} > 0$ for $= 1,...,d; j \neq k$ $\sim 310$ $\underline{y}_i \in P_{j-}$, if $|y_{ij}| > |y_{ik}|$ and $y_{ij} < 0$ for $= 1,...,d; j \neq k$ $x_i = x_j$, for $1 \leq i < j \leq d$, for the d-dimension spare $(x_i, ..., x_d)$ $\sim 315$

METHOD FOR AUTOMATED DETECTION OF DATA GLITCHES IN LARGE DATA SETS

BACKGROUND OF THE INVENTION

Corporations base important decisions on results derived from data. Therefore the verification of the accuracy of data is of utmost importance in order for the management of corporations to avoid faulty conclusions. Furthermore, detection of problems with the accuracy of data should be made in a timely fashion, because backtracking to fix data glitches and recover accurate analyses can be expensive and time consuming. In fact, if data corresponding to transactions are overwritten or retrospective access is expensive, recovery of the data might not be possible at all.

Traditionally, the data sets used by statisticians were collected meticulously either according to a pre-determined design or to answer specific substantive questions such as "Does drug A have a significant effect on reducing the symptoms of disease X?". The amount of data collected was generally small, the data were measured carefully and repeatedly, and the analyst had a fair idea of what the measured values should be. Anomalies were easy to detect just by examining the raw data or scatter plots. However the size and complexity of large data sets commonly encountered today renders visual scanning an infeasible screening method. Some analysts have adopted ad-hoc methods borrowed from quality control techniques used in manufacturing. While effective for process control in engineering and manufacturing, these methods do not translate well to immediate detection of inconsistencies in large complex data sets, especially for multivariate data.

Data glitches are abnormal patterns that are either aberrations from historical behavior, inconsistencies in sections of the data, or departures from acceptable tolerance limits. Earlier work has focused on detecting systematic changes that usually show up as differences that can be attributed to a substantive reason (e.g., "new subscribers have different usage patterns") and are accentuated over time. Data glitches on the other hand, tend to be scattered erratically across the data space and are not persistent over time (i.e., the cause of the data glitch usually disappears).

Data quality control in most instances is still implemented by the use of conventional quality control ("QC") charts. Famous examples of quality control charts are Shewhart charts, named after W. A. Shewhart who first proposed them in 1938 (e.g., X-charts, R-charts). There are many variations of Shewart charts as well as other charts such as the Cumulative Sum, the Operating Characteristics Curve, Average Run Length, p-chart and others, designed for different QC situations, including adjusting for trends over time.

Quality control charts are aimed at detecting a process that drifts out of control over time. Typically no action is taken unless there is a process run of abnormal outcomes. Moreover, sampling plays a critical role in the implementation of the charts. The method of sampling as well as the sample sizes will strongly influence the conclusions drawn from the charts. The assumption of normality is indirectly required.

A significant portion of data quality research has focused on managing and implementing data quality processes. Recently there has been an emphasis on data warehouses, and monitoring and measuring the information that resides in them. Most commercial and academic efforts in the database community are focused on merging/purging/deleting duplicates and issues related to name and address matching. In the statistical community, the focus is on quality control methods borrowed from process control charts. Extensions of control charts to multivariate settings have been proposed by researchers.

While previously-known QC methods have been used with success in industry, such methods are unsuited for detecting glitches within large, high-dimensional data sets because:
  Heterogeneity—Large data sets tend to be heterogeneous.
  Localized changes—Averages tend to be very stable, not easily moved by changes in small subsections of the data. Therefore charts based on overall aggregates will not detect glitches due to localized changes.
  Large number of attributes—Multivariate control charts are rare, especially without the normality assumption. Computing simultaneous confidence intervals is hard and visualizing them even harder. Bivariate charts for normally distributed data have been previously discussed. Depth-based control charts have been proposed for multivariate data using ranks to create analogs of the traditional quality control charts.

In the context of the automatic screening of data there are two other considerations that are important. These are:
  Immediate detection of glitches rather than over time or a sequence of samples.
  Isolating the areas or sections of the data (such as heavy users, long calls, revenue) that become corrupted because of the glitch.

Data mining methods are especially suited for the automatic detection of glitches in massive data. Such methods:
  scale well to large data sets
  isolate abnormal patterns, and
  do not (usually) make distributional assumptions.

Thus, a data mining method is needed that automatically and quickly (e.g., in linear time) detects data glitches over large data sets, isolates problematic sections of data, and is widely applicable.

SUMMARY OF THE INVENTION

Embodiments of the invention allow the efficient detection of glitches in a set of data. In one embodiment, a set of datapoints is received. The datapoints are transformed into a transformed space, and the transformed space is segmented into a plurality of regions. A time series is generated representing the trajectories of transformed datapoints through regions of the segmented and transformed space. Data corresponding to transformed datapoints whose trajectories exhibit an unusual pattern are transmitted.

DETAILED DESCRIPTION OF THE INVENTION

I Introduction

Embodiments of the invention provide an efficient method for detecting abnormalities in data. In certain embodiments, time series data is received wherein each datapoint comprises values for a predetermined number of attributes. The datapoints are transformed into a simplified representation that tracks how each datapoint behaves with respect to the collection of datapoints over time. The transformed time series is then analyzed, datapoints exhibiting unusual or rare behavior are flagged, and an alarm is transmitted to alert responsible entities to undertake further studies, or to rectify any errors if the unusual or rare behavior is determined to derive from an error.

In embodiments of the invention, the transformation of the datapoints is accomplished by first constructing a datasphere, and then segmenting the datasphere into regions and tracking the movements of the datapoints through the segments of the datasphere. The datasphere technique is particularly useful in detecting subtle changes in distributions, small shifts in interactions among variables and other local differences that are missed by aggregate based methods and univariate approaches. The method disclosed herein scales well and is free of distributional assumptions, making it widely applicable. Above all, the disclosed method may accommodate a multivariate treatment.

A datasphere is constructed by first selecting a suitable center for the set of datapoints that tracks the overall behavior of the set of datapoints. Each datapoint is then rescaled with respect to the chosen center. The rescaled values can then be used to track the trajectories of the rescaled datapoints with respect to the center. The distances of the rescaled datapoints from the center may also be calculated. The attributes of the data used to compute a distance are called depth attributes. Categorical attributes that can be used to stratify the data subsequently are called cohort attributes. For example, in a set of data in which each datapoint has the values for the age, gender and height of a person, each of the age and height may be chosen as depth attributes, whereas the gender may be chosen as a cohort attribute. As is clear from this example, depth attributes may be attributes unrelated to a component of spatial location.

A simplified representation that is capable of handling massive quantities of data can be obtained by segmenting the dataspheres into a plurality of regions. For example, n-dimensional hyperspheres centered at the chosen center may be chosen as the boundaries of layers for the datasphere. Additionally, each layer can be further segmented into regions according to the attribute with the greatest variation from the center. Then, the time series for a datapoint can be reduced to a time series for the location of the transformed datapoint through the regions of the datasphere. These transformed time series data for the datapoints can be analyzed to determine transformed datapoints that have unusual trajectories through the regions of the datasphere. Datapoints corresponding to transformed datapoints with such unusual trajectories can be flagged for further study.

II Data Glitches

Data quality may be measured in terms of accuracy, completeness and timeliness. Considerable time may be spent on ensuring completeness and timeliness of data during the process of collection, subject to resource constraints. Accuracy is often the last item to get attention and is sometimes skipped altogether.

A data glitch may include any change introduced in the data by causes external to the process that generates the data and that is different from the normal level of random noise present in most data sets. Noise is typically caused by uncontrollable measurement errors such as imprecise instruments, subtle variations in measurement conditions (normal wear and tear of hardware, software degeneration, climatic conditions) and human factors. Data glitches on the other hand are systematic changes caused by large-scale phenomena, such as unintended duplicate records, switched fields and so on. Some inconsistencies are obvious and easy to detect while others are subtle, and are noticed only after they have been compounded several times resulting in significant deviations from the true values, necessitating expensive backtracking. Localized errors are swamped in aggregates, and therefore go undetected for quite some time. Typically encountered data glitches include:

1. Unreported changes in layout: When data processing centers make changes, downstream users are not aware of these changes for a small interval of time. However, they continue to receive and use the data feeds during this interval. Some of these changes are obvious, such as a change in layout where the position of a 13-character string variable is switched with a float. But sometimes the changes are subtle, affecting only a few variables that resemble each other in their univariate behavior but differ in their interaction with other important variables. Univariate tests and aggregates will not detect such changes. An example of such a condition could be the switching of the fields that measure the customer usage of a service with two competing providers. While the overall patterns might be similar, the customer may be using each provider's service for d different purpose, causing interaction with other variables such as time of day, application and others.

2. Unreported changes in measurement/scale/format: In some situations, a field or variable is sent to the users without being processed completely. This could be due to a program exiting without completing, yet generating no error message. The processing could be such that it affects only a small proportion of the records, but such a problem could have serious consequences. An example is the application of volume discounts to generate customer bills. Some discounts are so structured that only a fraction of percentage of top users qualify. However, failure to process the discounts can create serious customer satisfaction problems alienating valuable customers. Again, tests based on aggregates often fail to detect such an error.

3. Temporary reversion to defaults: A third kind of frequently encountered glitch is caused by the defaulting of measuring devices to pre-set limits. For example, the reported length of any telephone call exceeding 100 minutes could be defaulted to 100, due to some temporary condition in the switches. Aggregates do not reveal such glitches unless the error condition persists for a prolonged period of time. However, the existence of such a condition for even short periods of time could result in lost revenues. Therefore it is important to detect such errors as close to real time as possible.

4. Missing and default values: Missing values are very frequent in data sets. There are many different ways of dealing with them, such as dropping them from analysis or substituting typical values for them. The approach depends on the amount of data missing as well as the nature of the application. There has been prior work on the treatment of missing values in statistics. An extra complication occurs when the missing values are defaulted to a valid value of the variable itself, usually an infrequent one. An example is representing missing values by zero, even though zero might be a valid but unlikely value of the variable. The implications can be serious if there is a sudden increase in the valid "zero" values, which will be masked by the missing "zero" values. While it is obvious that setting such defaults is incorrect, decisions for data collection and measurement processes are not necessarily made with a view to future analyses. Sometimes the limitations of the systems that process the data force such ambiguous defaults.

5. Gaps in time series records: Discontinuities in historical or transactional records can be detected easily once the need for detection has been established. For example, in a system that updates the status of a datapoint, it is simple to verify that the update applied to the old status results in the new status. Consider the following sequence of updates:
   A. current status=3 cellular phones, 4 phone lines
   B. update: drop=2 cellular phones, add=1 phone line
   C. new status=0 cellular phones, 9 phone lines.
   Clearly, some intermediate updates are missing in this example. However, the problem becomes serious when there are many such missing records and a large portion of the data set is quickly disqualified.

The classification of possible data glitches above is not exhaustive; infinitely many types of data glitches may exist. Embodiments of the invention may be useful in detecting any type of glitch, including the types classified above.

III The Measure of Regional Deviation in Embodiments of the Invention

Figure 6:
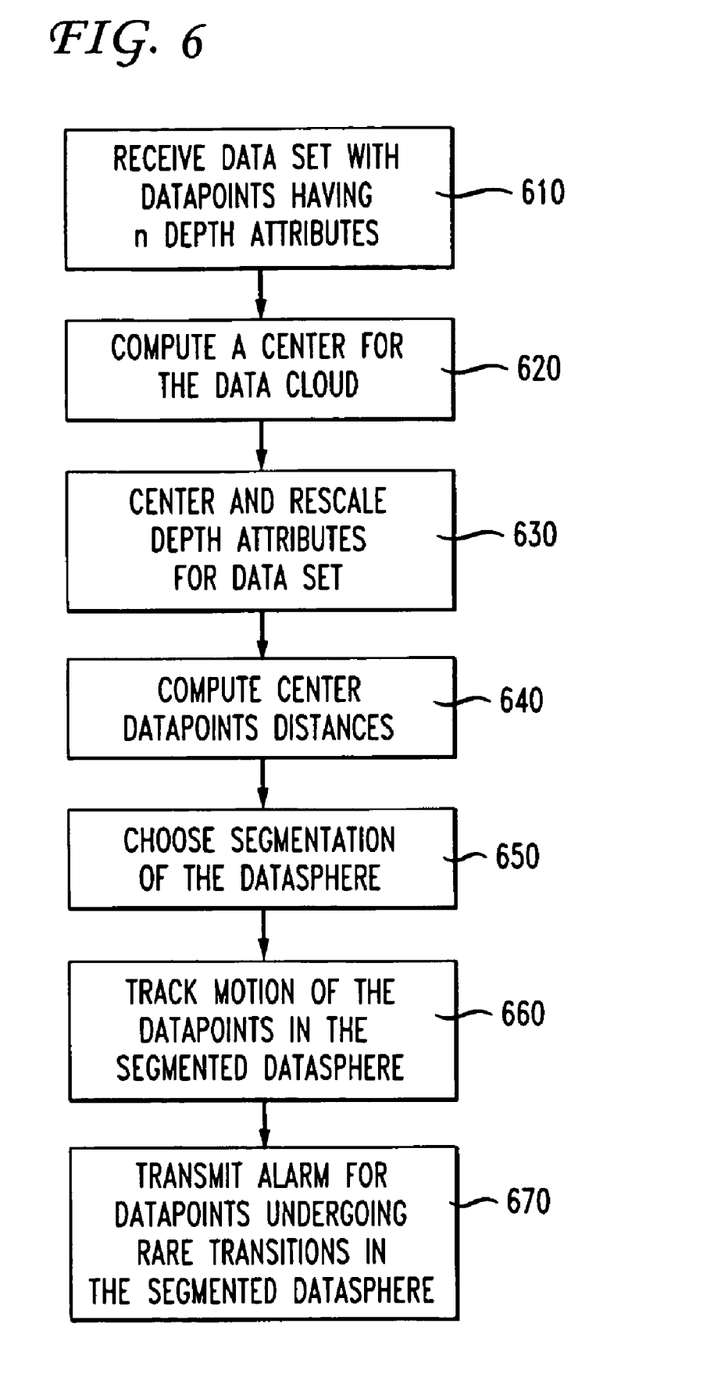
FIG. 6 shows a flowchart of the steps in an embodiment of the invention.

FIG. 6 illustrates the steps according to a method embodiment of the present invention useful in detecting data glitches. In step 610, a data set with datapoints having n depth attributes is received. For example, the data set may be received by a computer and placed into memory or a storage device of the computer. The data set may comprise the values of a plurality of n-dimensional measurement vectors over a plurality of time values; the value of a particular measurement vector at a particular value of time (i.e., a datapoint) then may include the values for the n depth attributes for that measurement vector at that point in time.

In step 620, a center point for the data set may be determined in n-dimensional space. Any suitable measure for the center of gravity for the data set may be used as the center point. The multivariate mean, the multivariate trimmed mean and the componentwise median are only a few of the quantities that can be used in determining a center point for the data set.

In step 630, depth attributes for the data set may be rescaled and centered about the center point calculated in step 620. For example, the difference between the value of an attribute and the mean value of the attribute over time scaled by the standard deviation of the value of the attribute can be used as the transformed value of the attribute. Other centering and rescaling schemes may also be used.

In step 640, distances between the chosen center and the transformed datapoints may be calculated using a chosen, suitable metric. These values can be used to define boundaries for the segmentation of the datasphere in step 650. For example, the datasphere may be initially segmented by defining boundary regions comprising concentric hyperspheres (centered on the chosen center) such that an equal number of transformed datapoints (e.g., at a given value of time) lie between adjacent boundary regions. The boundaries in this example thus depend on the distances of transformed datapoints from the center, as calculated at step 640.

In step 650, the datasphere may be segmented into a plurality of regions. For example, concentric hyperspheres centered on the chosen center may be selected as the boundaries for an initial segmentation of the datasphere. Each layer between adjacent hyperspheres (as well as the layer comprising the inside of the smallest hypersphere) may be further segmented-for example, by defining regions according to the attribute with the greatest variation from the center.

In step 660, the motion of the transformed datapoints throughout the regions of the segmented datasphere (i.e., the time series for each transformed datapoint) is tracked over time. In other words, a time series for each measurement vector through regions of the datasphere is obtained. Thus, the original time series for each measurement vector is transformed to a time series of regions in which the transformed measurement vector is located.

In step 670, datapoints corresponding to transformed datapoints that exhibit unusual patterns in their trajectories are flagged and an alert is sent indicating that the datapoints may be abnormal. Thus, the measurement vector corresponding to a transformed measurement vector exhibiting an unusual pattern in its time series of regions of the datasphere is flagged for further study. In one embodiment, unusual or abnormal patterns may be defined by users, a system administrator, or any other controlling entity (i.e., the patterns may be predetermined), and the measurement vector corresponding to a transformed measurement vector exhibiting a time series pattern matching a defined pattern may be flagged for further study. For example, the values over time for a flagged measurement vector can then be analyzed in greater detail using conventional statistical techniques. In another embodiment, the infrequency of a pattern may indicate that it is unusual; for example, a pattern in the trajectory that occurs rarely may be flagged as being unusual and flagged for further study.

Figure 1:
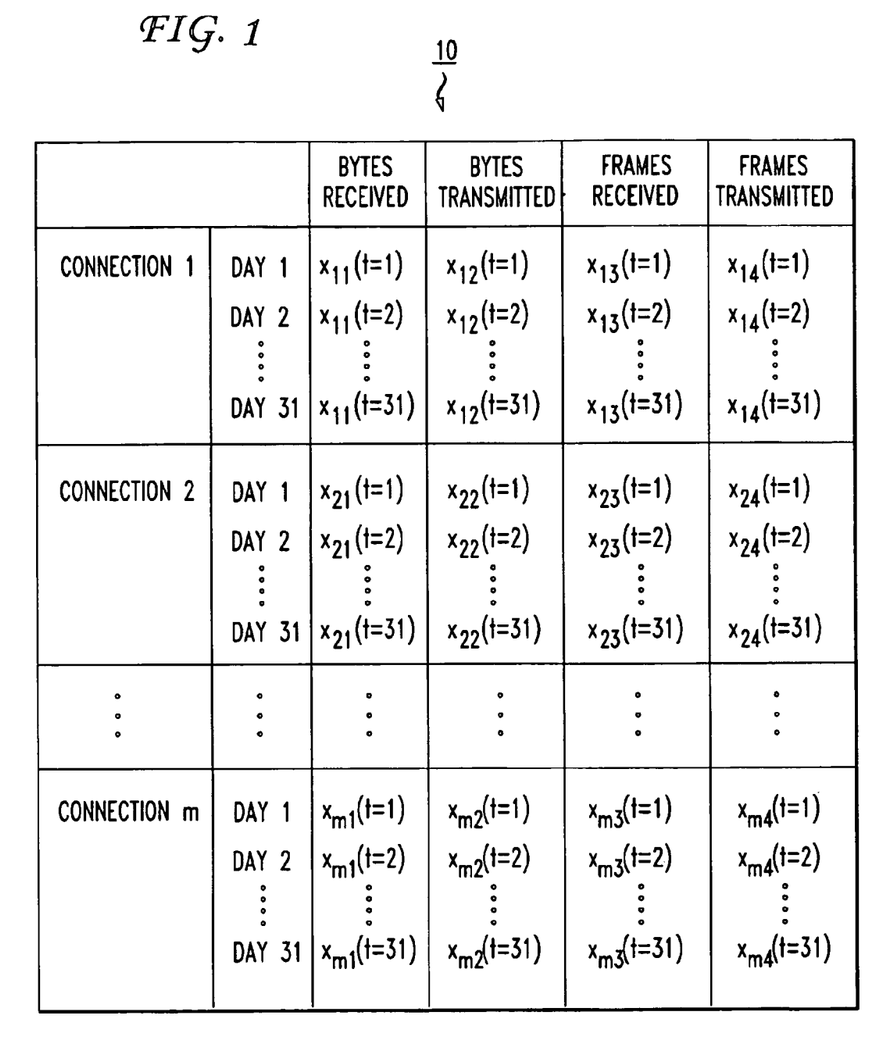
FIG. 1 illustrates a sample set of data that can be analyzed in accordance with embodiments of the invention.

FIG. 1 illustrates a sample set of data that can be analyzed for abnormal behavior in accordance with embodiments of the invention. Table 10 in FIG. 1 lists data with respect to each of m connections over a 31-day period that may, for example, be measured and recorded by an Internet Service Provider ("ISP"). Each connection is represented by a datapoint having four attributes relating to the user making the connection to the ISP: the bytes received by the user, the bytes transmitted by the user, the video frames received by the user, and the video frames transmitted by the user. In FIG. 1, the value for the $j^{th}$ attribute of the $i^{th}$ connection on the $k^{th}$ day is represented by the notation "$x_{ij}(k)$." In this example, each connection corresponds to a distinct measurement vector.

Figure 2:
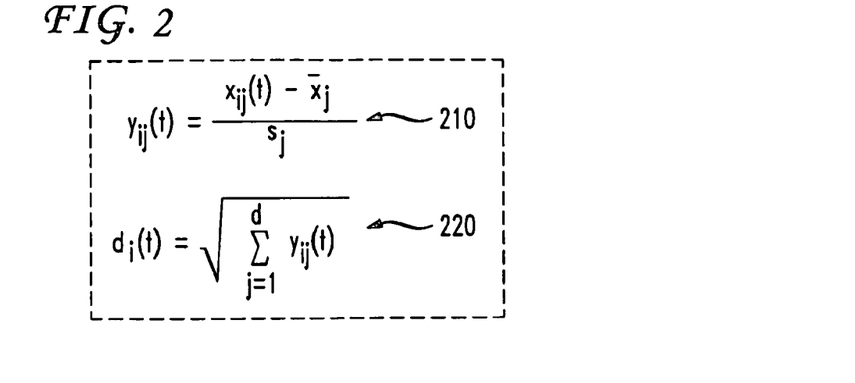
FIG. 2 shows the formulae for the transformed coordinates for datapoints in the datasphere representation for a particular choice of the center point of the datasphere, and a chosen distance function.

FIG. 2 shows exemplary formulae describing a particular choice of a center, a rescaling and a distance function in an embodiment of the invention. In formula 210, the point given by) $\bar{x}$. (i.e., the point given by the values $\bar{x}_1, \bar{x}_2, \ldots, \bar{x}_d$, where, $\bar{x}_j$ is the mean value of the $j^{th}$ component over all connections and times) is used as the center. Thus, the center point in the datasphere corresponds to the point obtained by taking the mean value of each of the components over all connections and over all values of time. Other measures may be chosen to establish a center point for the datasphere. The multivariate trimmed mean and the componentwise mean are only two of the many different statistical measures that may be chosen for establishing the center point. All of these choices are consistent with embodiments of the invention.

In formula 210, $s_j$ denotes a standard deviation of the data set given by $x_{ij}(t)$ for a particular value of j, over all connections and all values of time. Other known measures of the dispersion of a data set besides the standard deviation can be used in alternative embodiments. The values $y_{ij}(t)$ for j=1, . . . , d in formula 210, where d is the number of attributes for each datapoint, then give the transformed coordinates of the $i^{th}$ connection in the datasphere at time t.

Formula 220 of FIG. 2 shows the choice of a metric (or distance) function in an embodiment of the invention. Again, other choices for the metric function may be made. In formula 220, the value $d_i(t)$ represents the distance of the $i^{th}$ transformed datapoint from the chosen center.

Figure 3:
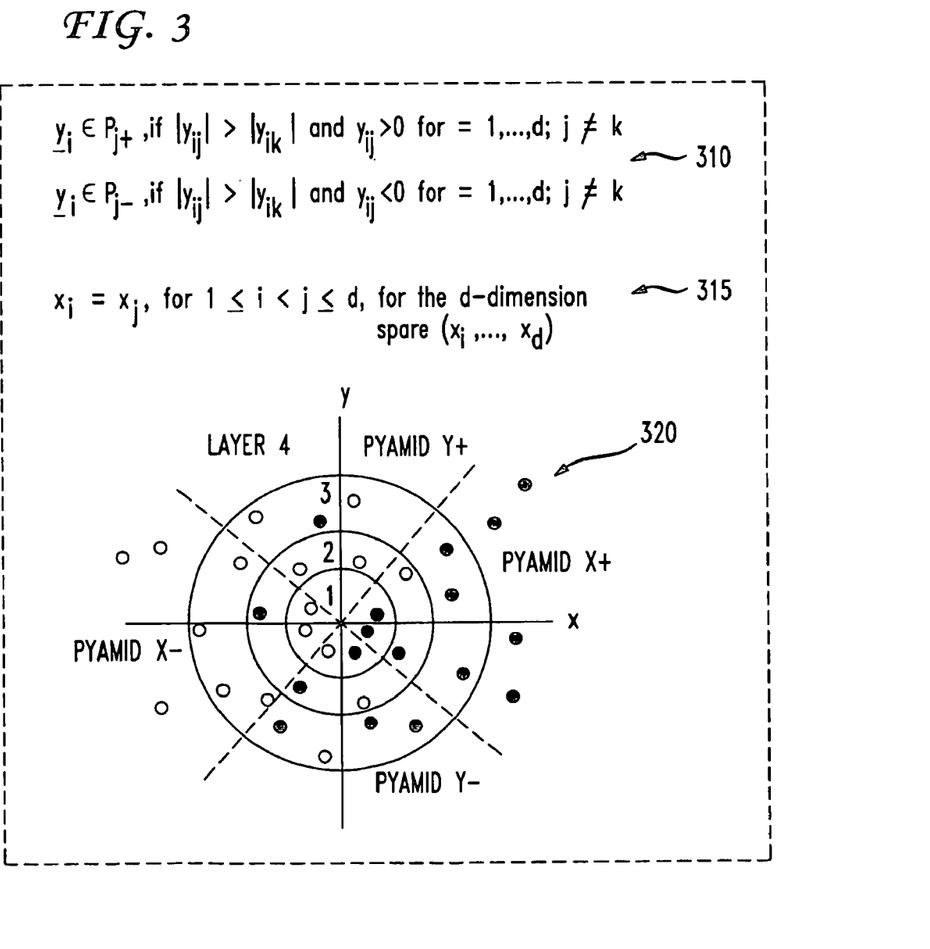
FIG. 3 shows an example of a segmented datasphere in two dimensions in which the boundaries of the regions are determined by concentric circles and radial lines at 45° to the axes.

FIG. 3 illustrates an example of a segmented datasphere in two dimensions (i.e., a case in which there are two depth attributes) together with the boundaries of the regions and transformed datapoints. The boundaries of the regions in datasphere 320 are shown as concentric circles (e.g., boundaries based on a measure of distance from the chosen center) and dotted diagonal lines; areas between adjacent concentric circles define "layers" (except for the layer labeled "1" in datasphere 320, which is defined as the area inside the smallest concentric circle), whereas the dotted diagonal lines split the datasphere into four "pyramids." Thus each region of the segmented datasphere is bounded by the arcs of the concentric circles (except for layer 1, for which the boundary is a single arc of a concentric circle) and sections of the dotted lines forming the pyramids. The more segmented a datasphere is, the more finely and precisely changes in behavior of the datapoints can be tracked.

The transformed datapoints of datasphere 320 in FIG. 3 are shown as the clear and black dots scattered across datasphere 320. Whether a datapoint is clear or black in the datasphere 320 shown in FIG. 3 may be affected by a cohort variable associated with the datapoint; for example, in datasphere 320, a black dot may denote a datapoint corresponding to a male, whereas a clear dot may denote a datapoint corresponding to a female. Thus, in this example, gender would be a cohort variable.

The exemplary pyramids shown on datasphere 320 are defined such that a datapoint is within an exemplary pyramid Pj+, if the first expression in expression 310 is satisfied, and is within an exemplary pyramid Pj−, if the second expression in expression 310 is satisfied, for the appropriate value for j. Under this definition of the pyramids, the boundaries of the pyramids are given by the collection of hyperplanes determined from expression 315. Although the sub-segmentation of adjacent hyperspheres accomplished through use of boundaries as indicated in expression 315 is a convenient way to complete segmentation of a datasphere, it is by no means the only way; any further segmentation of adjacent hyperspheres is consistent with embodiments of the invention. Moreover, segmentation of a datasphere through use of concentric hyperspheres is possible without any further segmentation; in such a case, the segmentation loses any information on the directional distribution of the transformed datapoints, because the regions obtained through the segmentation are spherically symmetric. More generally, a datasphere may be segmented according to any scheme; the choice of hyperspheres as boundary layers, although convenient, is only one out of the many different possibilities. Each of the different ways of segmenting a datasphere are within the scope of the present invention.

In cases where segmentation of a datasphere is performed in accordance with concentric hyperspheres, as exemplified in datasphere 320, the radii of the hyperspheres are parameters that may be tuned for the applications for which the glitch detection method is to be used. One sensible scheme is to choose the radii such that an approximately equal number of transformed datapoints are placed within each layer (e.g., at a chosen instant of time). Again, there exist many possibilities for the choice of the radii of the hyperspheres, and all of these choices are consistent with embodiments of the invention.

Figure 4:
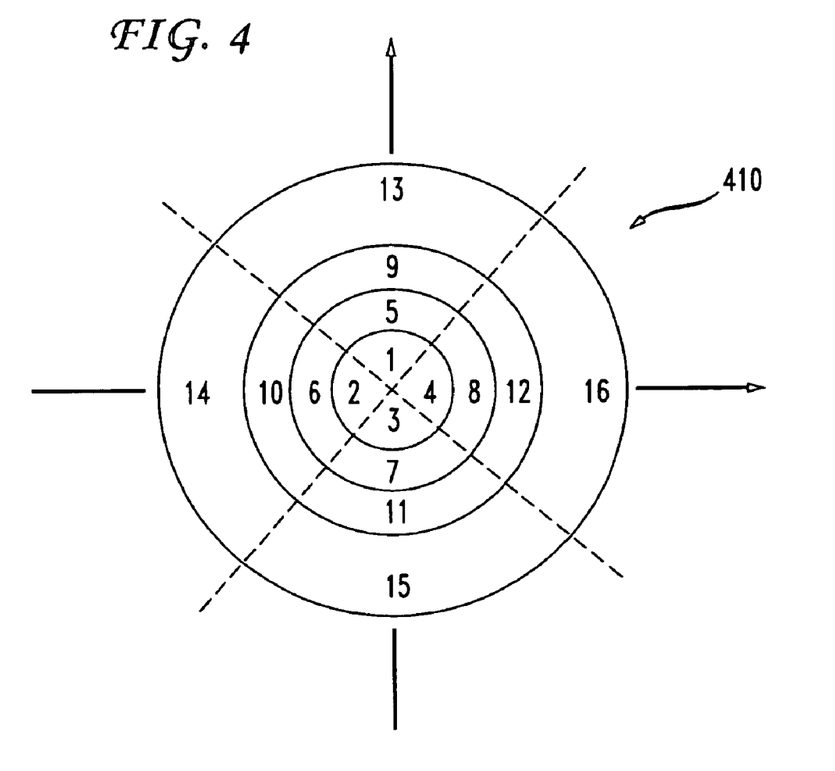
FIG. 4 shows a choice of labels for regions of a segmented datasphere.

FIG. 4 shows an example of a scheme for labeling regions of a segmented datasphere. Datasphere 410 has been segmented by concentric hyperspheres and the pyramid scheme of expression 310 of FIG. 3. Each segment resulting from the segmentation has then been assigned a unique label. Of course, an infinite number of labeling schemes are possible, and each of these labeling schemes is consistent with embodiments of the invention.

Figure 5:
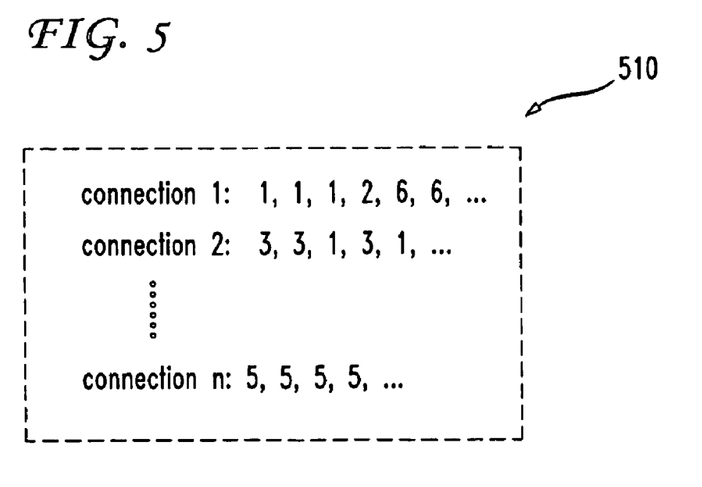
FIG. 5 shows an example of the time series of regions of a segmented datasphere that transformed datapoints generate and that represent the trajectories of the transformed datapoints through the segmented datasphere.

FIG. 5 shows an example of the time series that transformed datapoints generate in connection with their trajectories through labeled regions of a segmented datasphere. For example, in collection 510, the time series labeled "connection 1" refers to the trajectory of a transformed datapoint (e.g., the transformed datapoint corresponding to the data associated with connection 1 in Table 10 of FIG. 1) over time through regions of a segmented datasphere. Here, the transformed datapoint remains in the region labeled "1" for the first three time periods, then jumps to the region labeled "2" for the fourth time period, and then jumps to and remains in the region labeled "6" for the next two time periods.

Thus, complex multivariate time series data can be reduced to simplified time series data of paths of transformed datapoints through the regions of a segmented datasphere in accordance with the steps discussed above. For the purposes of this application, the measure of deviation of datapoints that can be obtained through this process will be called relative deviation, because it represents the movement of a datapoint relative to other datapoints over time.

The relative deviation measure can be considered, in a natural way, as part of a Markov chain approach, in that the various regions of the segmented datasphere may be considered to be "states" where a datapoint may be at a given instant of time. The probability of the movement of datapoints over time among these states may be summarized using transition matrices; for example, the $ij^{th}$ element of a transition matrix at a time t may represent the probability that a datapoint transitions from the $i^{th}$ region of the segmented datasphere to the $j^{th}$ region at time t. A transition matrix for a data generating process can be estimated by observing the data over a period of time. The observed transitions of the datapoints can then be used in estimating the elements of the transition matrix, which contains the probability amplitudes for transitions of the datapoints for the process. The estimated transition matrix may then be used to estimate the probability distribution of future transitions of datapoints. Any low likelihood transitions may then be flagged as an alert for further study, or a determination that a glitch has occurred in the data.

The relative deviation can also be measured using higher-order Markov chains, using transition matrices of a corresponding order. For example, an approach using a second-order Markov chain would summarize the movement of datapoints over time using a second-order transition matrix, whose $ijk^{th}$ component represents the probability that a data point transitions from the $i^{th}$ region of the segmented datasphere to the $j^{th}$ region at time t−1, and to the $k^{th}$ region of the segmented datasphere at time t.

IV The Within Deviation Measure and the Detection of Glitches

The relative deviation measure disclosed above in part I may be used to determine that a data glitch has occurred. Alternatively, the relative deviation measure may be used to only flag suspicious movements of datapoints for further study. Further study of suspiciously moving datapoints may be warranted to determine whether the motion of the datapoint deviates from what would be expected from its own behavior (as opposed to its expected movement relative to all of the datapoints, as measured by the relative deviation measure). One example of a within-deviation measure would be to fit a linear model to the time series for a datapoint that has a suspiciously-moving relative deviation measure and identifying departures from the model.

Within-deviation is defined as a measure to describe the "distance" of a data point (a customer's attribute values at a given time) in a time series with respect to an "expected value" for the time series at that point. In the examples above, the average taken over the entire time series is used as an expected value and the sum (over each attribute) of squares of deviations from the mean is used as a measure of distance. This is an effective, but relatively unsophisticated, measure of the within-deviation measure. The following are some of the different possible alternatives, each of which is within the scope of the present invention. Alternatives 2 and 3 below are more sophisticated in that they implement Auto Regressive Moving Average ("ARMA") algorithms. However, specific ARMA models may require goodness-of-fit tests that are more difficult to implement.

Alternative 1:

For a data point at time $t_i$, compute the mean and sum of squares based on data points that fall in a window around $t_i$, e.g., within the interval $[t_i-\Delta, t_i+\Delta]$. This makes the deviations more sensitive to local variations and is still quite easy to implement. A chi-square test may be used to determine statistical significance. Although issues with respect to the independence assumption may arise under such an approach, the approach is satisfactory for purposes of screening of data.

Alternative 2:

In a second alternative, a linear autoregressive model is used to fit the time series of every individual component and flag an alert if at least one component shows a statistically significant deviation. For example, one may use, for any given component:

$$Y(t)=C+\text{theta}*Y(t-1)+\text{epsilon}(t)$$

where epsilon(t) is such that E(e(t))=0. Higher-order expressions may also be used instead of this first-order expression. Another variation is ARMA—where, in addition to lags of Y (the Auto Regressive part), lags of epsilons (the Moving Average part) are also included:

$$V(e(t)=\text{sigma}^2, \text{ and } Cov(e(t),e(t-1))=0$$

Tests may then be used to determine whether the deviation is statistically significant. However, if the linear model taken is not appropriate, there will be a high number of alerts. Moreover, the determination of the ARMA may be computationally expensive.

Alternative 3:

In this alternative, auto regression and/or ARMA may be used on the time series of deviations derived from Alternative 1, above.

V Dealing with Glitches

Once the glitches are identified, there are two major issues that should be addressed. First, one needs to distinguish between real data problems and genuine but atypical changes in the data. Second, one needs to define the action to be taken with respect to the data glitches.

Some broad guidelines on telling the difference between a genuine problem and a legitimate change in the data are as follows:

Genuine changes are usually persistent over time, whereas data problems appear and disappear quickly.

Data glitches tend to appear randomly without any structure while genuine changes can be "rationalized". For example, a geographical proximity in the glitches would suggest a systemic cause such as a drought resulting in lower crop yields in that region. Similarly, a drop in revenues at a single point in time is more likely to be a data problem (missing data) than a sustained downward trend.

We can use the within-deviation of a data point to separate out differences with "structure" (systemic changes in the process that generates the data, resulting in shifts in the distribution) as opposed to random aberrations. Using departure from linear autoregressive models as measures of within-deviation is a potential way of detecting structure.

There are several approaches to dealing with data glitches, depending on the type of glitch as well as the purpose of the analysis.

1. If the original data set is sufficiently large, the error-prone data can be excluded or set aside. However, care is needed to ensure that excluding parts of the data in this manner does not introduce any bias in the analysis, such as excluding data specific to a particular location or time.

2. Another variation is not to include the record with glitches in analyses that require the corrupted attributes. For example, if only the March revenue is in question while the revenue for other months is accurate, the record should be included in all summaries and analyses except those that require the revenue for March. While this might seem obvious, many established ways of dealing with data problems would simply ignore the entire record, wasting large amounts of usable data.

3. Yet another option would be to "clean" the "glitched" data through manual or automated methods and return it to the data set before any analysis is done. While manual methods will probably result in better quality, they are impractical due to the expense involved. Furthermore, they could introduce other unanticipated errors. Automated methods are preferred for this reason.

A frequently used automated approach entails substituting missing or suspicious values with a summary statistic such as a mean or median. Such a method clearly introduces a circular bias by increasing the data mass at the value used to fill in the missing values. Under this scheme, all imputed values for a given attribute are the same.

A more sophisticated approach is based on regression. That is, the portion of data where the attribute is clean is used to develop a regression model and the resulting model is used to estimate (predict) the glitched value in the remaining data using the other attributes. Note that there are many possible models depending on the combination of attributes that are missing. Such an approach might be expensive.

VI An Example for ATM/Frame Relay Data

The following is an example of the use of the methodology disclosed herein in the context of an Internet Service Provider. A data set was obtained that measured four attributes for every "connection", namely Bytes Received, Bytes Transmitted, Frames Received and Frames Transmitted, over the 31-day period Mar. 1-Mar. 31, 2000. There were 15,596 connections that were observed daily. The data consisted of the daily totals of the four attributes during the 31-day period. The within-deviation of a point at time t was computed to simply be the sum of the standardized deviations of the individual attributes:

$$dev_i(t) = \sum_{j=1}^{d} \left( \frac{(x_{ij}(t) - \bar{x}_{ij})}{s_{ij}} \right)^2,$$

where $x_{ij}(t)$ is the value of the $j^{th}$ attribute of the $i^{th}$ data point (in this case, the connection of the $i^{th}$ user) at time t, $\bar{x}_{ij}$ is the 31-day average of the $j^{th}$ attribute for the $i^{th}$ data point, and $s_{ij}$ is the standard deviation of the $j^{th}$ attribute for the user's connection over the 31-day period.

The connection average for 31 days was used to create a data partition with four layers and eight pyramids, two pyramids for every attribute. For the purpose of simplification, all the negative pyramids were collapsed into a single "negative" orthant and all the positive pyramids into a single "positive" orthant within each of the four layers. Note that since the summaries in the profiles are aggregable, combining the classes of the partition to create a coarser partition is easy, without having to revert to the raw data and recreating the partition anew.

Next, the transition matrices were computed using the sample proportion:

$$\hat{P}(i, j, t) = \frac{n_{ij}(t)}{n_i(t)},$$

where P(i, j, t) is the probability of changing from state i to state j at time t, ($\hat{P}$ denotes an estimate), $n_i(t)$ is the number of points in state i at time t and $n_{ij}(t)$ is the number of points that move from state i at time t to state j at time t+1.

The estimated probability of changing states at any point in time was greater than 0.75, usually more than 0.8. Therefore, we extracted the entire multivariate time series for every data point that changed its state at least once in the 31 day period. That is, we used a "change in state" to flag data alerts. The change in state happens when a data point crosses a class (i.e., region) boundary which in turn is a function of all four attributes. Note that if data points changed states more frequently, we could have defined the most likely transition state(s) whose transition probabilities add up to some threshold (say 0.80) and flag all other states as abnormal. This is yet another way to define the relative deviation.

In this example, there was one distinctive feature that set the data problems apart from the changes caused by abnormal but genuine events. This was a successive flip-flop in states, such as, for example, i→j→i, over three consecutive time steps. This was usually caused by missing data or a short term outage that caused the traffic to drop.

Figure 7:
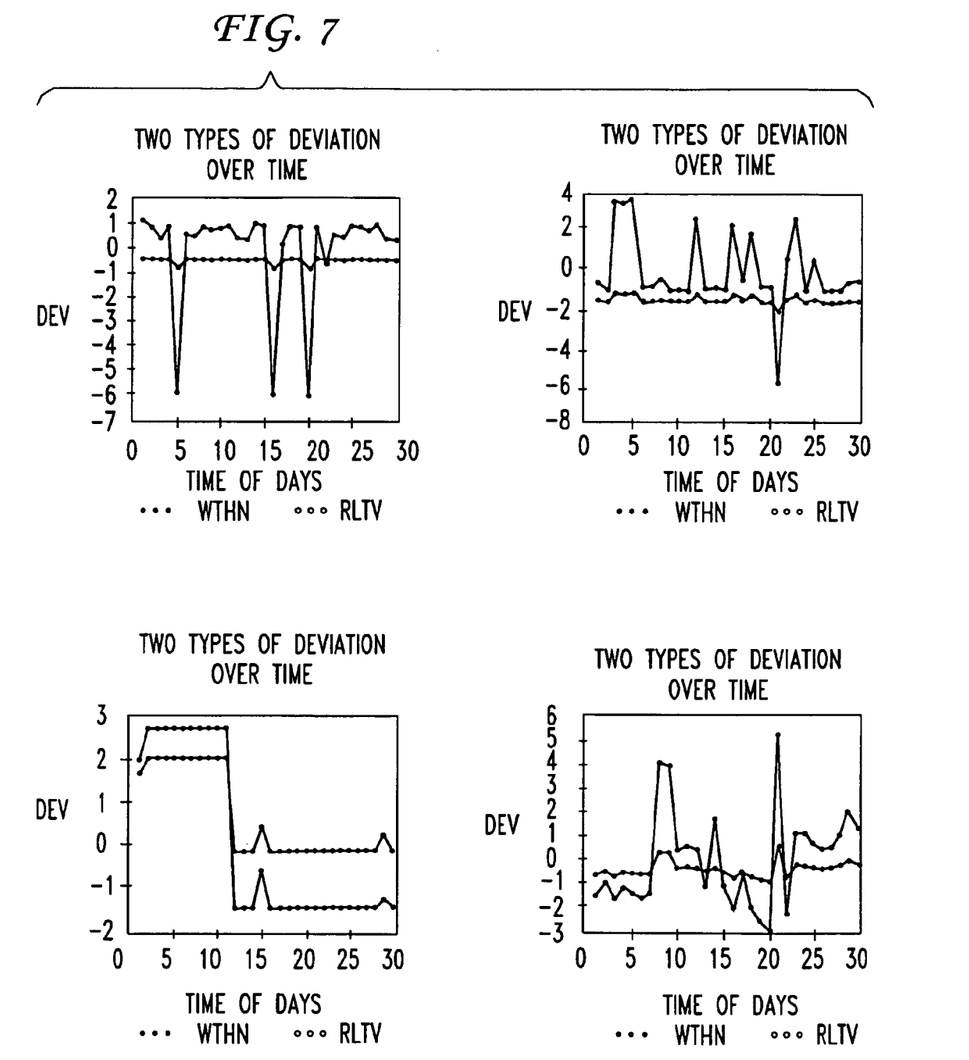
FIG. 7 shows graphs illustrating examples of the use of an embodiment of the invention in the determination of abnormal patterns in data.

FIG. 7 shows four representative types of "abnormal patterns" for purposes of illustration. In graph 710 of FIG. 7, the data problem is indicated by a consecutive flip-flopping of states indicated by the relative deviation (RLTV). (For the purpose of plotting alone, a suitable transformation has been used of the change in state variable to denote relative deviation.) It is apparent that the within-deviation (WTHN) is much more volatile. The fact that the within-deviation drops to the same level each of the three times indicates that the values are being set to some default value (like zero) due to missing data.

Graph 720 of FIG. 7 exhibits significant volatility indicating occasional bursts of activity. However, the within-deviation at time 21 is in the opposite direction and drops to a default value indicative of missing data.

The behavior shown in graph 730 of FIG. 7 is quite different. The drop in the two deviations is indicative of migration of usage to other services or carriers, with occasional dribbles of traffic. Note that the flip-flop at times 15 and 30 correspond to within-deviations of different amounts indicating that they are genuine bursts of traffic rather than data problems.

Finally, graph 740 of FIG. 7 seems to indicate a genuinely volatile customer. The flip-flop at time 17 is probably legitimate and not a data problem. This could happen when a data point is close to the partition class boundary (i.e., the boundary of a region in the segmented datasphere).

Thus, the within- and relative-deviation measures have been used to isolate a handful (20%) of the data as potentially "dirty" in this example. Note that automatic detection techniques such as logistic regression or machine learning or clustering are expensive and will not be effective on noisy data.

VII Other Embodiments

Figure 8:
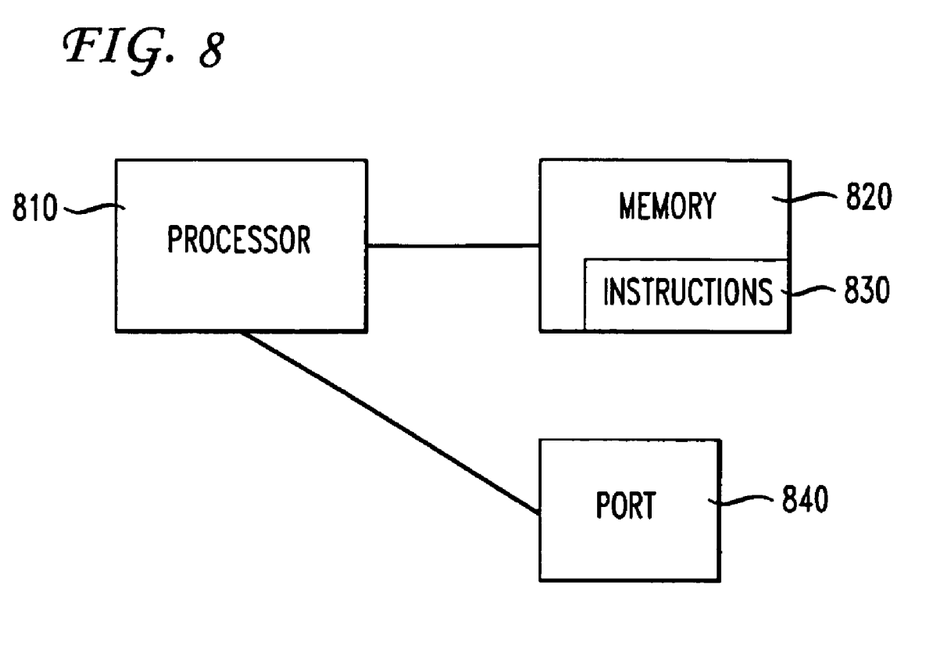
FIG. 8 shows a block diagram of the components in an embodiment of the present invention.

FIG. 8 illustrates an apparatus embodiment of the present invention. In FIG. 8, processor 810 is coupled to port 840 and memory 820. Port 840 may be any type of port used for input or output; in particular, an output of a process executed by processor 810 may be transmitted through port 840. Memory 820 can store instructions 830 that are adapted to be executed by processor 810. In particular, memory 820 can store instructions 830 corresponding to any method embodiment of the present invention, including embodiments explicitly discussed in this disclosure.

In an embodiment, a computer-readable medium stores instructions that when executed cause a processor to perform the steps in any method embodiment of the present invention. For example, in such embodiments, memory 820 may be the computer-readable medium storing the instructions 830 which, when executed by the processor, cause the steps in a method embodiment of the invention to be performed.

As described above, the various embodiments of the present invention describe data mining techniques through the use of dataspheres. These techniques are effective tools in detecting faults in data. The techniques described scale well and are tailored to handle heterogeneity. The datasphere technique in particular detects (at very little expense) subtle shifts in variable interactions and distributions. Existing techniques such as those based on aggregates, univariate approaches or conventional quality control methods that require distributional assumptions cannot detect such small changes.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A method for detecting data glitches in a set of datapoints comprising:
   receiving a set of datapoints, each of the datapoints having n attributes, where n is an integer greater than zero;
   transforming the datapoints into a datasphere representation;
   segmenting the datasphere into a plurality of regions;
   determining a plurality of time series representing the trajectories of the transformed datapoints through regions of the segmented datasphere; and
   transmitting data in connection with transformed datapoints whose trajectories exhibit an unusual pattern.

2. The method of claim 1 wherein the transforming step includes choosing a common center for the datapoints and transforming the values of the attributes of each datapoint based on the common center.

3. The method of claim 2 wherein the boundaries of the segments of the datasphere are at least partially based on the common center.

4. The method of claim 3 wherein at least part of the boundaries of the segments of the datasphere are formed by concentric hyperspheres of dimension n centered on the common center.

5. The method of claim 4 wherein at least another part of the boundaries of the segments of the hypersphere are formed by the boundaries of n-dimensional pyramids given by the following formulae:

$$x_i = x_j, \text{ for } 1 \leq i < j \leq d$$

where $x_i$ denotes the transformed value of the $i^{th}$ attribute, and d denotes the total number of attributes.

6. The method of claim 5 wherein in the transforming step, the transformed value of an attribute for a datapoint is calculated based on the difference between the value of the attribute for the datapoint and the mean value of the attribute over all datapoints and all time, scaled by the standard deviation of the value of the attribute for the datapoint over all datapoints and all time.

7. The method of claim 1 wherein the unusual pattern is identified based on the frequency of at least one transition of a transformed datapoint between regions of the segmented datasphere.

8. The method of claim 1 including the step of statistical analysis of datapoints corresponding to the transformed datapoints whose trajectories exhibit an unusual pattern.

9. The method of claim 1 wherein the unusual pattern, for one of the transformed datapoints, includes a transition from a first region of the segmented datasphere to a second region followed by a transition from the second region back to the first region.

10. The method of claim 1 wherein the unusual pattern is an infrequent transition.

11. A computer-readable medium having stored thereon instructions that, when executed, cause a processor to:
   receive a set of datapoints, each of the datapoints having n attributes, where n is an integer greater than zero;
   transform the datapoints into a datasphere representation;
   segment the datasphere into a plurality of regions;
   determine a plurality of time series representing the trajectories of the transformed datapoints through regions of the segmented datasphere; and
   transmit data in connection with transformed datapoints whose trajectories exhibit an unusual pattern.

12. A method for detecting data glitches in a set of datapoints comprising:
   receiving a set of datapoints;
   transforming the datapoints into transformed space;
   segmenting the transformed space into a plurality of regions;
   determining a plurality of time series representing the trajectories of the transformed datapoints through regions of the segmented transformed space;
   transmitting data in connection with transformed datapoints whose trajectories exhibit an unusual pattern.

13. The method of claim 12, wherein in the receiving step, a plurality of values of attributes is received for each datapoint in the set.

14. The method of claim 12, wherein at least one of the attributes for which values are received is an attribute not representing a component of spatial location.

15. The method of claim 14 wherein the transforming step transforms the datapoints into a datasphere representation.

16. The method of claim 12 including the step of statistical analysis of datapoints corresponding to the transformed datapoints whose trajectories exhibit an unusual pattern.

17. The method of claim 12 wherein the unusual pattern is an infrequent transition.

18. An apparatus for determining a network traffic anomaly, the apparatus comprising:
   (a) a processor;
   (b) a port coupled to the processor; and
   (c) a memory, coupled to said processor, said memory storing instructions adapted to be executed by said processor, the instructions including:
      receiving a set of datapoints, each of the datapoints having n attributes, where n is an integer greater than zero;
      transforming the datapoints into a datasphere representation;
      segmenting the datasphere into a plurality of regions;
      determining a plurality of time series representing the trajectories of the transformed datapoints through regions of the segmented datasphere; and
      transmitting data in connection with transformed datapoints whose trajectories exhibit an unusual pattern.

19. The method of claim 18 wherein the transforming step includes choosing a common center for the datapoints and transforming the values of the attributes based on the common center.

20. The apparatus of claim 19 wherein the unusual pattern is identified based on the frequency of at least one transition of a transformed datapoint between regions of the segmented datasphere.

21. The apparatus of claim 20 wherein the datapoints corresponding to the transformed datapoints whose trajectories exhibit an unusual pattern are analyzed statistically for glitches.

22. A method for detecting glitches in a set of data, the set of data including the values of each of a plurality of measurement vectors at a plurality of time values, the value of a measurement vector at a given time value including the values of a plurality of attributes associated with the measurement vector at the time value, the method comprising:
   receiving the set of data;
   transforming each measurement vector of the plurality of measurement vectors at each value of time into a datasphere representation;
   segmenting the datasphere into a plurality of regions;
   determining a time series representing the trajectory of each of the plurality of transformed measurement vectors through regions of the segmented datasphere; and
   transmitting data in connection with transformed measurement vectors whose trajectories exhibit an unusual pattern.

23. A method for detecting data glitches comprising:
   representing a datapoint as a first time-dependent vector;

generating a second time-dependent vector based on the differences between the first time-dependent vector and a center vector at each of a plurality of time values;

comparing the second time-dependent vector against a predetermined segment map at each of the plurality of time values;

determining a sector-region occupied by the second time-dependent vector based on the comparison at each of the plurality of time values; and flagging the datapoint if the determined sector-regions match a predetermined pattern.

24. The method of claim 23 wherein the center vector is determined based on a plurality of datapoints including the datapoint.

* * * * *